United States Patent
Dover

(10) Patent No.: US 10,838,879 B2
(45) Date of Patent: *Nov. 17, 2020

(54) MEMORY PROTECTION BASED ON SYSTEM STATE

(71) Applicant: Micron Technology, Inc., Boise, ID (US)

(72) Inventor: Lance W. Dover, Fair Oaks, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/507,943

(22) Filed: Jul. 10, 2019

(65) Prior Publication Data

US 2020/0012605 A1 Jan. 9, 2020

Related U.S. Application Data

(63) Continuation of application No. 15/469,287, filed on Mar. 24, 2017, now Pat. No. 10,387,336.

(51) Int. Cl.
*G06F 12/00* (2006.01)
*G06F 12/14* (2006.01)
*G06F 3/06* (2006.01)

(52) U.S. Cl.
CPC ........ *G06F 12/1458* (2013.01); *G06F 3/0622* (2013.01); *G06F 3/0637* (2013.01); *G06F 3/0655* (2013.01); *G06F 3/0659* (2013.01); *G06F 3/0679* (2013.01); *G06F 3/0688* (2013.01); *G06F 12/1441* (2013.01); *G06F 12/1466* (2013.01); *G06F 2212/1052* (2013.01); *G06F 2212/202* (2013.01); *G06F 2212/214* (2013.01)

(58) Field of Classification Search
None
See application file for complete search history.

(56) References Cited

U.S. PATENT DOCUMENTS

| 9,449,189 | B1 | 9/2016 | Harman et al. |
| 9,898,420 | B2 | 2/2018 | Obara et al. |
| 9,904,794 | B2 | 2/2018 | Kim et al. |

(Continued)

FOREIGN PATENT DOCUMENTS

| CN | 103927268 | 7/2014 |
| CN | 106066832 | 11/2016 |

(Continued)

OTHER PUBLICATIONS

"International Application Serial No. PCT/US2018/024064, International Preliminary Report on Patentability dated Oct. 3, 2019", 11 pgs.

(Continued)

*Primary Examiner* — John A Lane
(74) *Attorney, Agent, or Firm* — Schwegman Lundberg & Woessner, P.A.

(57) ABSTRACT

Disclosed in some examples are memory systems, computing systems, and machine readable mediums for protecting memory at identified addresses based upon access rules defining permissible access to the identified memory addresses that depends on the value of one or more registers stored in the memory system. In some examples, the value of the registers (e.g., a Platform Configuration Register) may depend on a state of a computing device in which the memory system is installed.

20 Claims, 6 Drawing Sheets

(56) References Cited

U.S. PATENT DOCUMENTS

| | | |
|---|---|---|
| 10,387,336 B2 | 8/2019 | Dover |
| 2003/0084278 A1 | 5/2003 | Cromer et al. |
| 2006/0294596 A1 | 12/2006 | Govindarajan et al. |
| 2009/0089861 A1 | 4/2009 | Catalano et al. |
| 2010/0106929 A1 | 4/2010 | Krig |
| 2012/0079590 A1 | 3/2012 | Sastry et al. |
| 2015/0220453 A1 | 8/2015 | Heisswolf et al. |
| 2016/0028728 A1 | 1/2016 | Hampel et al. |
| 2016/0246534 A1 | 8/2016 | Koob et al. |
| 2018/0276146 A1 | 9/2018 | Dover |

FOREIGN PATENT DOCUMENTS

| | | |
|---|---|---|
| CN | 110612517 | 12/2019 |
| EP | 1193602 A2 | 4/2002 |
| WO | WO-2016018234 A1 | 2/2016 |
| WO | 2018017590 | 1/2018 |
| WO | WO-2018175909 A1 | 9/2018 |

OTHER PUBLICATIONS

"International Application Serial No. PCT/US2018/024064, International Search Report dated Jul. 13, 2018", 3 pgs.

"International Application Serial No. PCT/US2018/024064, Written Opinion dated Jul. 13, 2018", 9 pgs.

"Chinese Application Serial No. 201880030467.7, Office Action dated Mar. 31, 2020", w English translation, 18 pgs.

U.S. Appl. No. 15/469,287, Non Final Office Action dated Jul. 10, 2018, 6 pgs.

U.S. Appl. No. 15/469,287, Response filed Sep. 27, 2018 to Non Final Office Action dated Jul. 10, 2018, 9 pgs.

U.S. Appl. No. 15/469,287, Notice of Allowance dated Dec. 12, 2018, 5 pgs.

U.S. Appl. No. 15/469,287, Notice of Allowance dated Apr. 9, 2019, 9 pgs.

U.S. Appl. No. 15/469,287, 312 Amendment filed Jul. 3, 2019, 8 pgs.

U.S. Appl. No. 15/469,287, PTO Response to Rule 312 Communication dated Jul. 17, 2019, 2 pgs.

U.S. Appl. No. 15/469,287, now U.S. Pat. No. 10,387,336, filed Mar. 24, 2017, Memory Protection Based on System State.

US 10,838,879 B2

MEMORY PROTECTION BASED ON SYSTEM STATE

PRIORITY APPLICATION

This application is a continuation of U.S. application Ser. No. 15/469,287, filed Mar. 24, 2017, which is incorporated herein by reference in its entirety.

TECHNICAL FIELD

Embodiments pertain to improved memory systems. Some embodiments relate to improved computer system security by restricting memory access at the memory system to one or more locations based upon a value of a control register which may be reflective of a system state measurement.

BACKGROUND

Most forms of computer systems include memory systems including one or more types of memory structures for temporary and long-term storage of instructions (such as programs), data, and other information used or generated by the computer system. The term "computer system" is used herein to broadly refer to a system using one or more microprocessors, microcontrollers and/or digital signal processors or other devices having the capability of running a "program" (all such devices being referred to herein as a "processor"); wherein a "program" is any set of executable machine code instructions (and therefore includes user-level applications, as well as system-directed applications, or daemons). Examples of different forms of computer systems are discussed herein, in reference to FIG. 5.

In many such computer systems, volatile memory is used to store currently executing computer programs, data, and other information needed by the processor while the device is powered. Examples of commonly-used volatile memory include Synchronous Dynamic Random Access Memory (SDRAM), Double Data Rate SDRAM (DDR), and the like. Similarly, in many such computing systems non-volatile memory is used for long term or persistent storage of programs, generated or retained data, or other information, etc. Non-volatile memory can include any one or more of many different configurations of nonvolatile memory storage, with flash memory being the most common, but other types of devices are also used, including phase change memory (PCRAM) (in various forms), magnetic memory (MRAM), and ferro-electric memory (FeRAM), etc. in some systems at least some portion of the nonvolatile memory, may be in the form of a solid state drive (SSD), serving the long term rewriteable storage function of a conventional magnetic hard disk drive (HDD), and typically implemented through use of NAND flash memory in combination with control functionality. Computer systems may also rely on other storage mechanisms as well, such as HDDs, Optical media (such as CD-ROMS, CDR/RW-ROMS and DVD-ROMs), etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
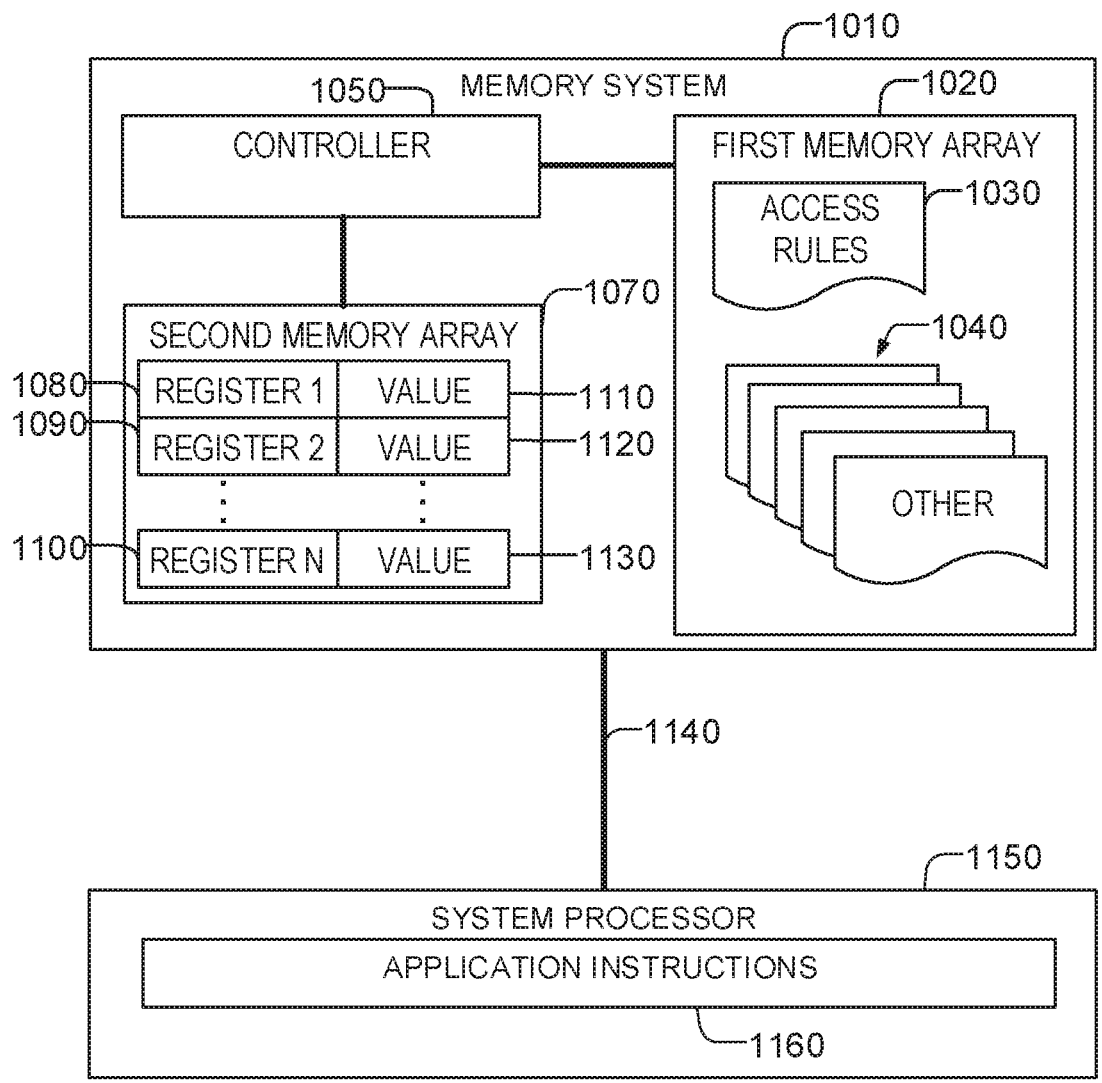
FIG. 1 shows a schematic diagram of a memory system according to some examples of the present disclosure.

One common way an attacker attempts to compromise a computer system is by changing memory contents of memory locations in either volatile or non-volatile memory. For example, if an attacker were to corrupt boot level code of the operating system or the UEFI firmware, they could re-direct the control flow of the processor to execute their own code. These low-level attacks may not be detectable by standard OS-present anti-virus or attack detection software running on the computer system. In addition to hijacking control of the instruction flow, attackers may attempt to read sensitive information, such as cryptographic keys, and other data that may be utilized to steal personal information from users of the computing devices or may be utilized in future exploits of the computer system.

Disclosed in some examples are memory systems, computing systems, and machine readable mediums for restricting access to memory at identified addresses according to a set of one or more access rules and based upon the value of one or more control registers. Access rules may be stored in the memory system and may specify that a particular control register be a particular value in order to access a particular memory location in a particular manner (e.g., read, read/write). The control registers may be stored in the memory system and may have restrictions on the operations used to set, change, or reset their values. Upon receiving a memory access request (e.g., read/write request) the memory system controller may evaluate the access rules given the current control register's state to determine if the access is allowed. By implementing the access control at the memory system level, the memory may be protected from malicious applications installed on the computer system.

In some examples, the value of the control registers may be set based upon a state of one or more components of the computing system in which the memory system is installed. For example, a trusted application executing on the processor of the computing system may take computing system measurements and then modify (e.g., extend) one or more of the registers based upon the measurements. For example, during boot time, certain memory locations may be accessible, but may be made inaccessible by modifying the control registers to protect the memory locations from modification. As this process is controlled by the memory controller in the memory system based upon access rules and control registers that are internally stored, memory locations may be locked from access by the memory system itself at a level lower than an operating system level, making it more difficult for attackers to gain access to important memory locations. In some examples one or more of the control registers may be a platform configuration register (PCR) which is a storage register that is the same length as an SHA-1 or SHA-2 digest. It may be utilized to hold a value that summarizes measurement results presented to it. PCRs are normally associated with a trusted platform module (TPM).

As an example, at system boot, the control registers may be set to 0. An example access rule may allow access to a particular area of memory when a particular one of the control registers is 0. The particular area of memory may store the bootloader or other sensitive operating system code. When the particular register is 0, the memory may be accessed to allow reading and writing of the bootloader. Once the bootloader is finished loading the operating system, the register may be extended (e.g., by the bootloader, operating system, or other trusted application) such that it is no longer zero, and the memory is no longer accessible.

To prevent malicious code from resetting the control registers, in some examples, the operations that can be performed on the control registers may be restricted. For example, the memory system may prevent the control registers from being directly set. Instead, the memory system may only allow the control registers to be extended. Extending a control register comprises utilizing the current value of the register and a supplied value as inputs to determine a new value of the control register. For example, the current value of the register and the supplied value may be inputs to a one-way mathematical formula that outputs the new value for the register. A "one way" mathematical formula comprises a formula that is easy to get from inputs to result, but difficult or impossible to get from result back to the inputs. An example is a SHA hash such as SHA1 or SHA2. The supplied value may be supplied by software applications executing on the processor of the computer system and may comprise a system measurement taken by the software applications of the computer system. These software applications may provide the new value by requesting that the register be extended, using a request message sent to the memory device over the communications interface (e.g., SATA, IDE, SCSI) used by the memory system and the other components of the computer system to communicate. Since the value of the control register depends on the previous value of the control register as well as the new value, it is more difficult to manipulate the value of the control register (such as to allow) access.

For example, the control register may be initialized to zero (or another initial value) at system start. During one or more points in a system boot, measurements of a computer system in which the memory system is installed may be taken by components of the operating system or another trusted application executing on the computer system. The operating system or trusted application may extend the control register with each measurement. If what is measured is selected such that an uncompromised system produces the same measurements at each point in the system boot, an expected value of the control register at each point may be known. The access rules may then be designed around these expected values so as to provide access to memory locations depending on which point in the boot process the computer system is in. Thus, memory that is at one time in the boot process accessible, may transition (e.g., by extension of the register) to being inaccessible (e.g., either not writeable, not readable, or both) by virtue of being in a different stage of booting, or by virtue of an unauthorized (or unintentional) change in the software on the computer system. Because the control register is only extendable and not set directly, transitioning the control register back to a prior state may be difficult or impossible.

In some examples, to extend a control register:

$$\text{New register value} = \text{SHA-1}(\text{old register value} | \text{new data})$$

In this example, the new data submitted by the application (an extension value) may be Secure Hash Algorithm-1 (SHA-1) hashed and combined with the old register value (e.g., the register value before the new value is set). For example, if the register is a 20 byte register, and the new data is 20 bytes, a 40 byte temporary value is created through concatenation where bytes 0-19 store SHA-1 (old data) and bytes 20-39 store the new value. Then, an SHA-1 hash is calculated for this 40 byte temporary value. As SHA-1 outputs 20 bytes, the new value is then copied into the register.

Other SHA variants may also be used with the control registers disclosed herein. For example, SHA-2—such as SHA-256, SHA-384, and SHA-512. In these examples, the PCR may have a different number of bytes and extend operations may use different size temporary memory (e.g., to accommodate a larger hash).

As noted, the control register may be extended based upon computer system measurements taken by one or more applications on the computing device. In some examples, in order to extend a register (or otherwise set a register), the application must be a trusted application. For example, the application may need to have access to a cryptographic key to encrypt a request to extend a control register, or to sign the request with the required key. The controller then verifies that the application is trusted based upon either successfully decrypting the message or by successfully verifying the signature. In other examples, the trusted application may sign the request with its private key and the controller may have pre-installed public keys for trusted applications (e.g., issued by a trusted manufacturer or other third party) that may then be used to verify the signature.

In some examples, the measurements of the computer system may be hashes of values stored in various memory areas (e.g., non-volatile memory) to ensure that an expected application, or group of applications exist in their expected state. In other examples, the measurements of the computer system may be processor states, hashes of applications residing in non-volatile storage (to detect tampering), or state values (e.g., the trusted applications may pass certain predefined values to use for extending the registers).

Turning now to FIG. 1, a schematic diagram of an example memory system 1010 is shown according to some examples of the present disclosure. Memory system 1010, includes a first memory array 1020, and a second memory array 1070. In the depicted example, second memory array 1070 may be utilized by controller 1050 as part of the controller 1050 or as a separate component communicatively coupled to the controller 1050. For example, second memory array 1070 can be formed on one or more semiconductor dies forming a part of controller 1050. In many examples, first memory array 1020 will be a non-volatile memory array, and second memory array 1070 will be a volatile memory array, though a non-volatile memory array may also be utilized. In some examples, the first memory array 1020 will be present in the form of a flash memory device, such as a discrete flash memory device or a flash memory-based SSD.

In some examples, both of the first and second memory arrays 1020, 1070, as well as controller 1050 may be formed on a single semiconductor die; while in other examples they may be included on two or more semiconductor die. The described structures may be retained on one or more printed circuit boards, or within one or more modules or unit (such as a multi-chip module, an assembly of PCBs, in an SSD, etc.). The memory system may be communicatively coupled to a system processor, and potentially other components of a computing system, through an interface 1140.

Memory system 1010 may be installed in, or otherwise communicatively coupled to a computer system (such as computer system 5000). The memory system 1010 includes a first memory array 1020 (e.g., a memory circuit) which is constructed to store data in one or more addressable memory storage locations. In some examples, first memory array 1020 may comprise non-volatile storage. First memory array 1020 may comprise one or more NAND circuits, in the case that memory system 1010 is an SSD, or one or more magnetic platters in the case that memory system 1010 is a HDD, or the like. First memory array 1020 may store one or more access rules 1030 and include other storage space 1040 (e.g., user data, software applications, operating systems, and the like). First memory array 1020 may provide multiple addressable memory storage locations. The location shown for access rules 1030 and other storage space 1040 is exemplary and they may be in any order and may be in any location in first memory array 1020. As stated previously, access rules 1030 may specify memory access restrictions for memory addresses in first memory array 1020 (or another first memory array) that may depend upon the value of one or more control registers (e.g., values 1110-1130 of control registers 1080-1100).

The example memory system 1010 includes a controller 1050. Controller 1050 may be implemented in various forms, for example, as a hardware processor, in microcode, in software which provides instructions for a hardware processor, as a Field Programmable Gate Array (FPGA), in programmable logic blocks, or the like. Controller 1050 may implement a portion of the communications protocol with which the computer system and the memory system 1010 communicate. For example, such communications protocol may be, for example, a Serial AT Attachment (SATA) interface, a Small Computer System Interface (SCSI) interface, a Peripheral Component Interconnect Express (PCI Express) interface (such as through a Non-Volatile Memory Host Controller Interface Specification—NVMe interface), and the like. Commands attempting to read or write data to the memory system 1010 may be sent by the system processor 1150 of the computer system based upon application instructions 1160 of one or more applications over the interface 1140 (e.g., a system interconnect or bus). Interface 1140 may be a SATA interface, a SCSI interface, a PCI Express interface, or the like. In other examples, the interface may be internal to a memory system. For example, an internal communication protocol among microchips of a SSD. Controller 1050 may receive and verify the requests and convert the requests to signals that cause the read/write to be implemented in the first memory array 1020.

Second memory array 1070 may comprise working memory (in some examples, volatile memory) used by the controller 1050 to process received memory commands. Second memory array 1070 may include one or more control registers (shown as PCRs) 1080, 1090, 1100 (from 1-N registers), each with an associated value 1110, 1120, and 1130. Values may be any number of bits in size, e.g., 8 bits, 16 bits, 20 bits, 32 bits, 40 bits, 64 bits, 128 bits, and the like.

In some examples, the ability to set, reset, and extend the value of the registers is restricted by the controller 1050. For example, an application requesting the setting, resetting, or extension may need to supply one or more credentials, use one or more cryptographic keys (e.g., in a digital signature, or by encrypting the request), or the like. In some examples, even trusted applications may be restricted from performing certain operations (e.g., resetting the register). For example, even trusted applications may be allowed only to extend the register.

In many examples, the described access rules 1030 include a conditional expression dependent upon the value of one or more registers (e.g., one or more of control registers 1080-1100) and permissions (e.g., read, write, read-write, no access) for one or more addresses. In many examples, the access rule is will be effective or not depending on whether the conditional expression evaluates to true or not. One example access rule may be: if control register 1080 value 1110 equals 0, then memory between addresses 0xE000:0000 to 0xFFFF:000F is read-only, else, the memory is not accessible (no read or write access). Another example, an access rule may specify that: if control register 1080 value 1110 does not equal 0, then memory between addresses 0xE000:0000 to 0xFFFF:000F is read-write otherwise, the memory is not accessible. In other examples, the access rule may be more complex, for example being dependent on multiple conditional expressions (as may be reflected in multiple registers, for example).

Access rules may be set by one or more trusted applications that supply one or more credentials, use one or more cryptographic keys (e.g., in a digital signature, or by encrypting the request), or the like. In some examples, the access rules may be preconfigured on the memory system by the manufacturer or another trusted party (e.g., an IT administrator). In some examples, the access rules 1030 may be configured such that a control register may control access to the access rules 1030. For example, upon manufacturing a control register in non-volatile storage may be set to 0. The access rules 1030 may be modifiable while this register is 0. An operating system that first boots up may configure the access rules (e.g., setting the access rules and permissions according to known-good measurements) and then modify the register in non-volatile storage, locking the rules.

Figure 2:
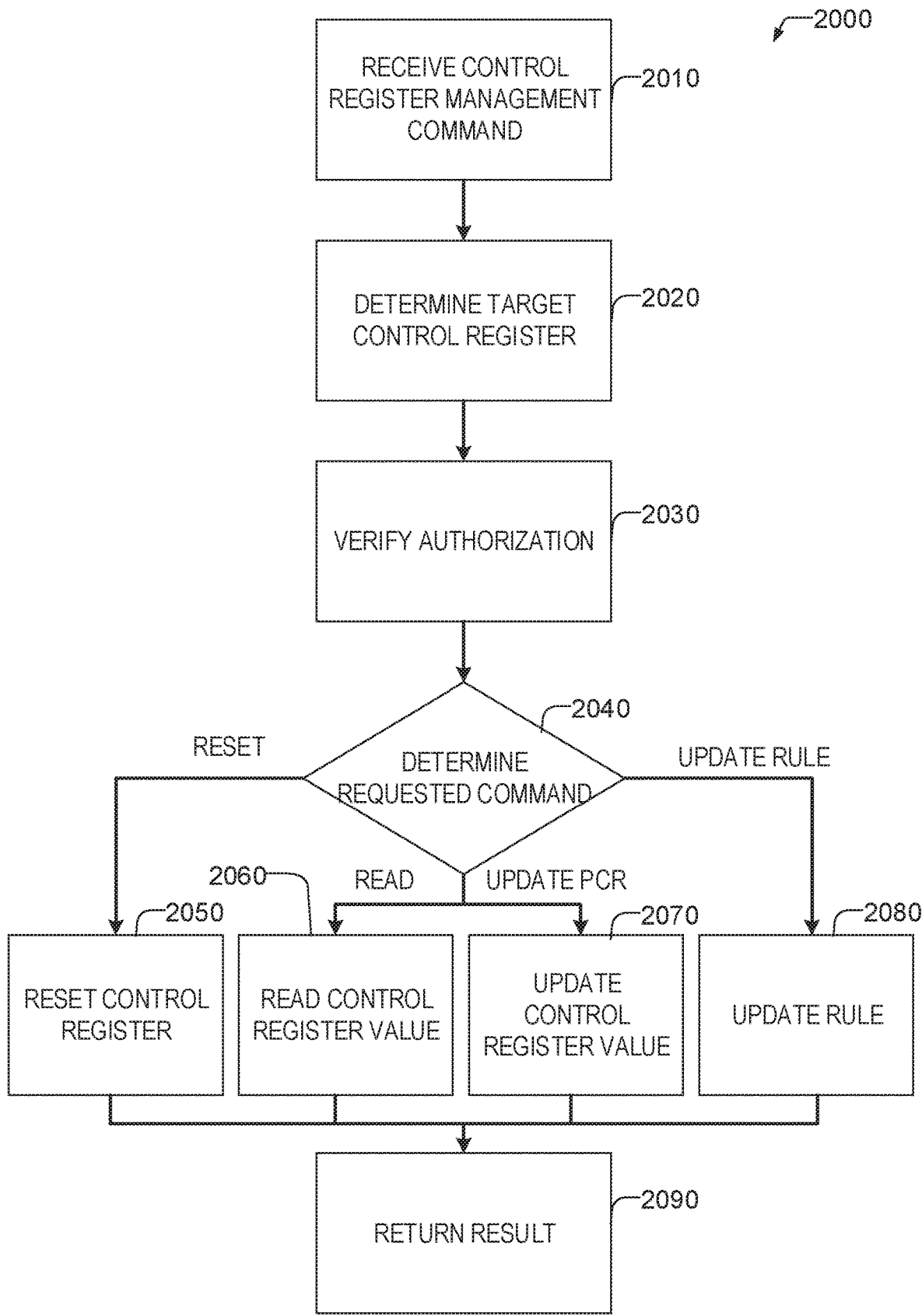
FIG. 2 shows a flowchart of a method of processing control register commands (such as PCR register commands) according to some examples of the present disclosure.

Turning now to FIG. 2, a flowchart of a method 2000 of processing control register commands (such as PCR register commands) is shown according to some examples of the present disclosure. FIG. 2 may be performed by a control module (e.g., control module 1060) of a memory system (e.g., memory system 1010). At operation 2010 the memory system may receive a control register management command. The command may originate from an application running on a processor of a computing device (e.g., the management command may be sent across a system bus). The processor and the application may be communicatively coupled to the memory system across a communication bus or interface (e.g., a SATA interface). The register management command may specify a control register, a management command, and one or more arguments. The control register management command is a request to perform the operation specified by the management command on the specified register using the one or more arguments. Example commands include resetting the control register, reading the control register, updating the control register value (e.g., extending the control register), and updating an access rule.

At operation 2020, the register that is the target of the register management command is determined—e.g., by parsing the control register management command. At operation 2030, the memory system may verify that the requestor has authorization to perform the operation. As noted, this may be based upon a cryptographic signature included with the request. In these examples, operation 2030 may comprise verifying the signature included with the register management command. In other examples, the register management command (or a portion thereof) may be encrypted with a particular key. In these examples, operation 2030 may comprise attempting to decrypt the register management message. In these examples, operation 2030 may occur before operation 2020 to allow for parsing the message to determine the target register.

At operation 2040, the memory system may determine the requested command (e.g., from a parameter in the control register management command). In some examples, the authorization at operation 2030 may depend on the command type, that is, some commands may require certain levels of authorization that other commands do not. Additionally, in some examples, authorization is not necessary. The register management command types shown in FIG. 1 are exemplary only and a person of ordinary skill in the art with the benefit of the present disclosure will appreciate that fewer or more commands may be implemented.

If the command is a control register reset at operation 2050 the control module may reset the control register to an initial value (e.g., 0). In some examples, the control register reset command may only be valid at power up of the system. At operation 2090 a result indicating whether or not the operation was successful may be returned to the caller. If the command is a request to read the value of the control register at operation 2060 the control register is read and the value may be returned at operation 2090. At operation 2070, if the request is to update the control register value, the register may be updated based upon an argument included with the request. For example, the control register may be set directly or may be extended based upon the argument. At operation 2090, a result (success or failure) may be returned. In some examples, the new value of the register as extended may be returned with the result. At operation 2080, if the request is to update an access rule, the access rule may be updated and at operation 2090 a result returned.

Figure 3:
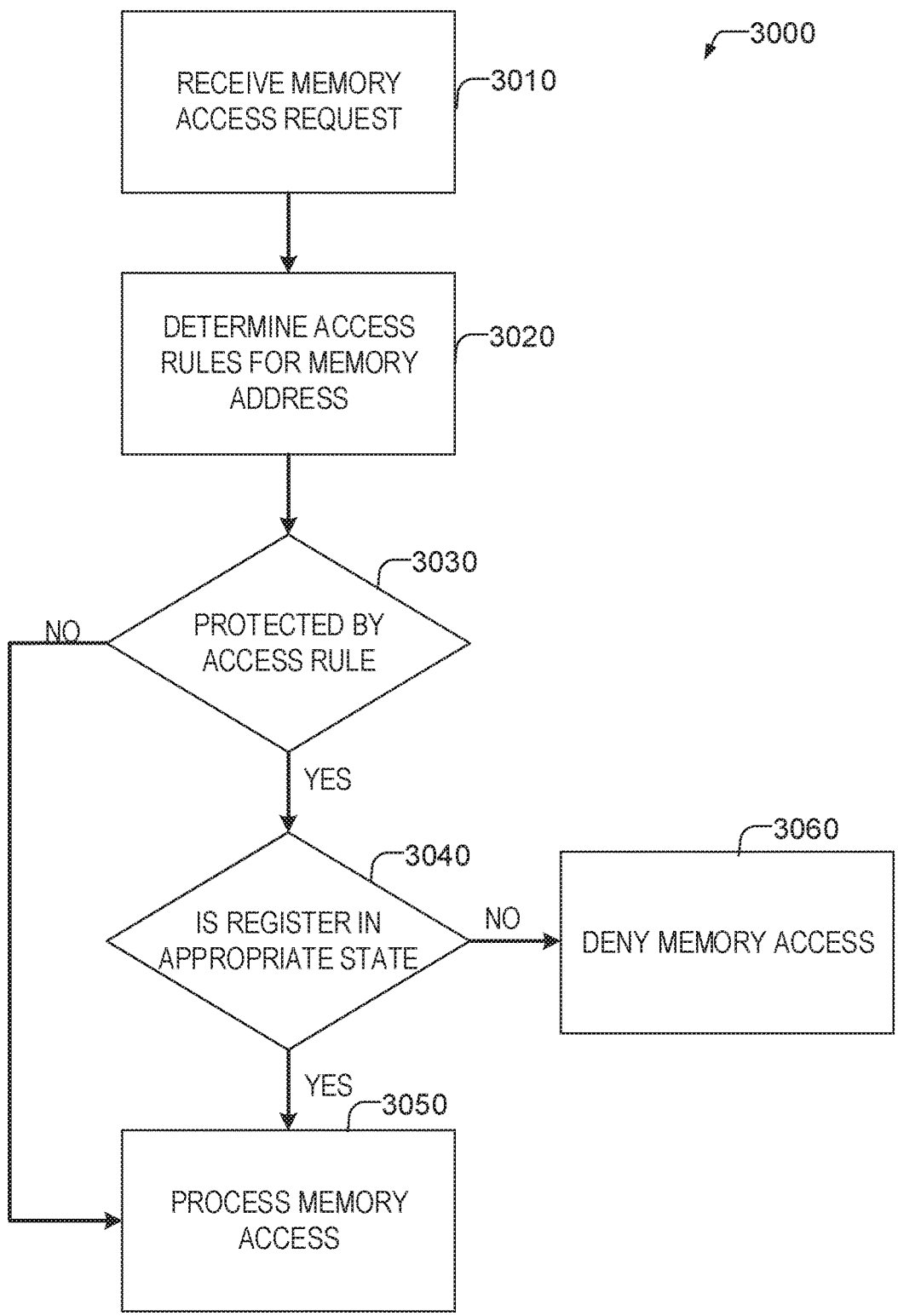
FIG. 3 shows a flowchart of a method of processing a memory access request according to some examples of the present disclosure.

FIG. 3 shows a flowchart of a method 3000 of processing a memory access request according to some examples of the present disclosure. FIG. 3 may be performed by a controller (e.g., controller 1050) of a memory system (e.g., memory system 1010). At operation 3010 the memory system may receive a memory access request (e.g., a read or write request). The request may originate from an application running on a processor of a computing device. The processor and the application may be communicatively coupled to the memory system across a communication bus or interface (e.g., a SATA interface). The request may specify a memory address, a command (e.g., read or write), and one or more arguments (e.g., new value in the case of a write), and the like.

At operation 3020, the access rules may be read to determine if the memory address that is the subject of the request is protected by an access rule. At operation 3030, if it is determined that the memory address is not protected by an access rule, then the memory access may be processed at operation 3050. If the memory address is the subject of an access rule, then at operation 3040 a determination is made whether the register values conforms to the access rules (e.g., it is not the appropriate value given the access rules). If the register value conforms to the access rules then the memory access may be processed at operation 3050. In some examples, different types of access may have different rules. For example, a read may have different access rules than a write. If the register is in the appropriate state, as specified by the access rules, then at operation 3050, the memory access may be processed as normal. If the register value does not conform to the access rules, then the memory access may be denied at operation 3060.

It is noted that while PCRs and system measurements are typically associated with trusted protection modules (TPMs), the TPM is only able to alert the software on the computing device when measurements are not as expected. The software may take corrective action, but the damage may already be done, and moreover, if the attack affected low level code below the operating system, the code checking the TPM may be affected. By placing the PCRs on a memory system and controlling access to memory addresses based upon the state of a PCR, the memory system allows for protection of sensitive areas from attack at the storage level by removing vulnerable system software from the decision making process. Thus the PCRs may be utilized for more than just detecting intrusions, the memory system may directly prevent unauthorized memory access.

Figure 4:
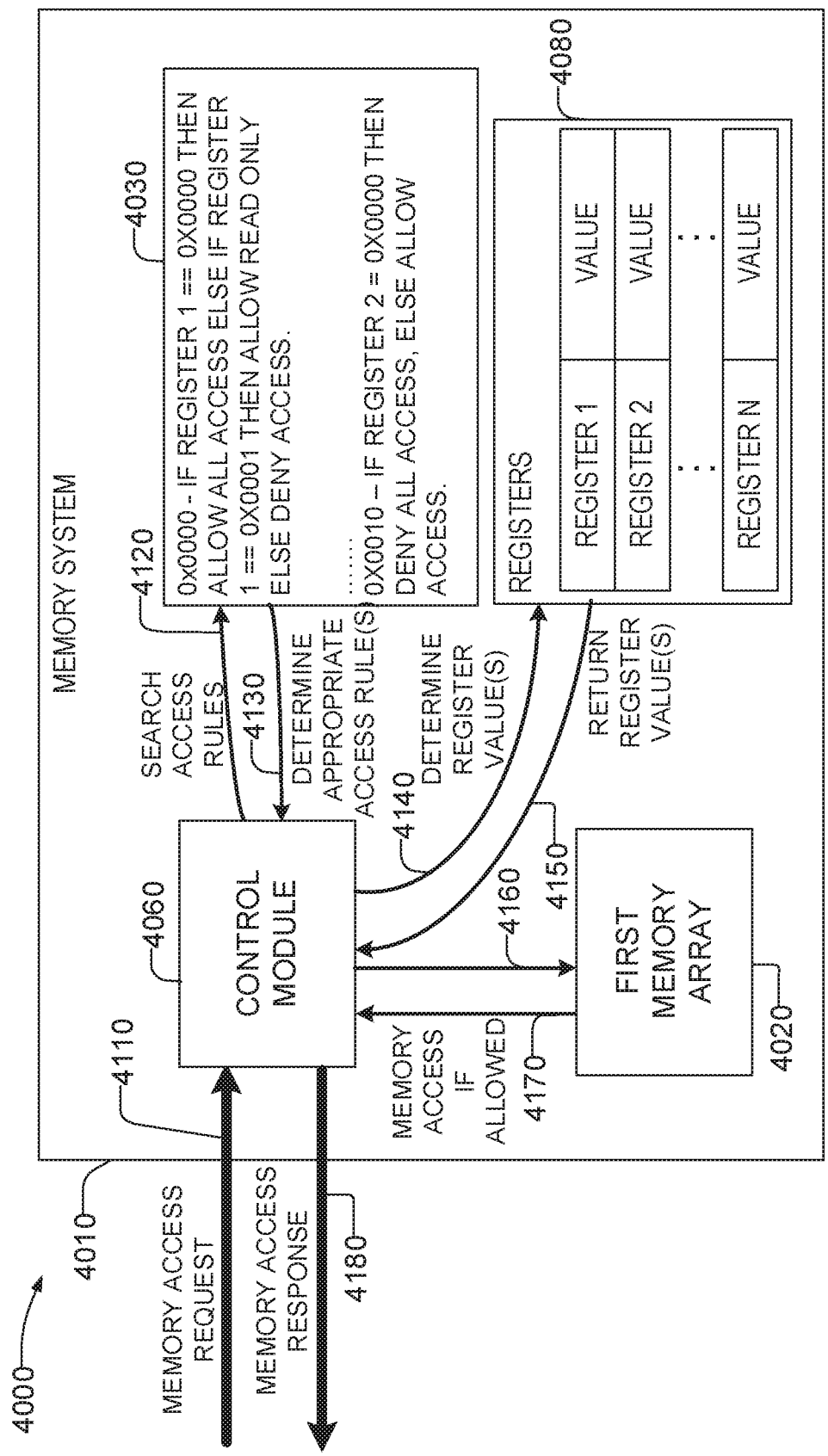
FIG. 4 illustrates a memory access process flow through the memory system according to some examples of the present disclosure.

FIG. 4 illustrates a memory access process flow 4000 through the memory system 4010 according to some examples of the present disclosure. Memory system 4010 may be an example embodiment of memory system 1010 according to some examples of the present disclosure. Memory access request 4110 may be received by the control module 4060. The memory access request 4110 may be issued by another component of a computer system (e.g., a processor executing instructions) or the like. Control module 4060 may access one or more access rules 4030 at operation 4120. Access rules 4030 may be stored in non-volatile storage (such as first memory array 4020). A copy of access rules 4030 may be loaded into volatile storage for fast access. In some examples, some of the access rules 4030 may be stored in volatile memory and some may be stored in non-volatile memory. Thus determining the access rules 4030 may involve loading them from either or both volatile or non-volatile memory.

The access rules may be organized in a variety of manners, but in one example, the access rules may be in a database format that is indexed by memory address. Thus the control module 4060 may utilize the memory address submitted in the memory access request 4110 to return the appropriate access rules at operation 4130. The access rule(s) returned may reference one or more registers 4080. At operation 4140 the control module 4060 may determine one or more values from registers 4080 to evaluate the access rules. These registers may be returned at operation 4150. Registers 4080 may be stored in volatile or non-volatile memory. Control module 4060 may perform operations 4120, 4130, 4140, and 4150 by accessing stack, heap, or other allocated forms of volatile memory by for example executing one or more memory management instructions or by accessing non-volatile memory. The access rules may be evaluated by the control module 4060 to determine if the memory access is allowed. If the memory access is to be allowed, then at operation 4160 the memory access may be performed. A result may be received at operation 4170 by the control module 4060 (e.g., a value of a read operation, or a result of a write), which may be passed back at operation 4180. If the memory access is denied, then a failure message may be returned at operation 4180.

Figure 5:
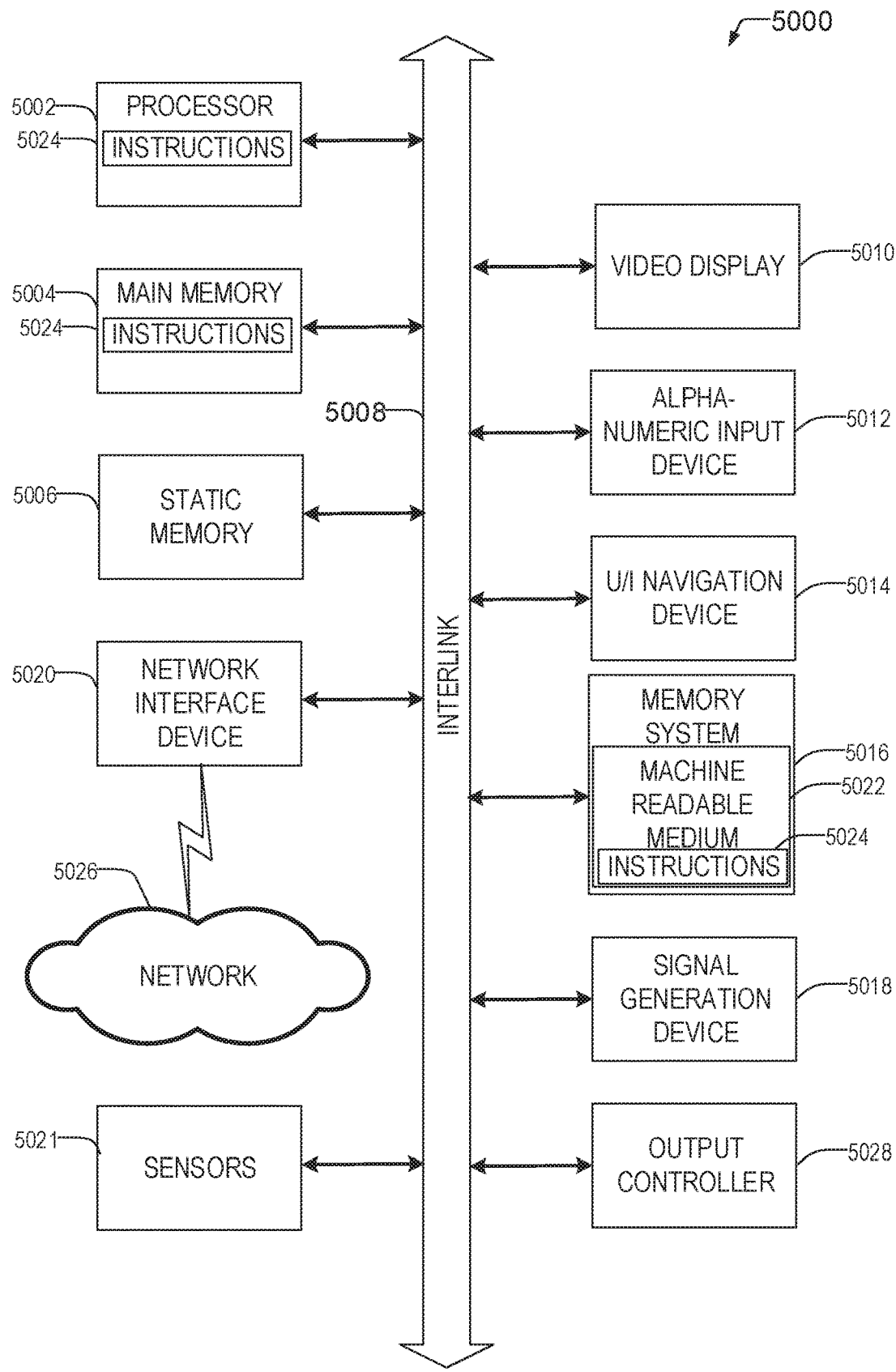
FIG. 5 is a block diagram illustrating an example of a machine upon which one or more embodiments may be implemented.

FIG. 5 illustrates a block diagram of an example computer system 5000. The components in FIG. 5 are exemplary, and a computer system with more or less components may In alternative embodiments, the computer system 5000 may operate as a standalone device or may be connected (e.g., networked) to other machines or computer systems. In a networked deployment, the computer system 5000 may operate in the capacity of a server, a client, or both in server-client network environments. In an example, the computer system 5000 may act as a peer in a peer-to-peer (P2P) (or other distributed) network environment. The computer system 5000 may be a personal computer (PC), a tablet PC, a set-top box (STB), a personal digital assistant (PDA), a mobile telephone, a smart phone, a web appliance, a network router, switch or bridge, an Internet of Things (IoT) device, an automotive device, or any machine capable of executing instructions (sequential or otherwise) that specify actions to be taken by that machine. Further, while only a single computing device is illustrated, the term "computer-system" may also include any collection of computing device that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Computer system 5000 may include a hardware processor 5002 (e.g., a central processing unit (CPU), a graphics processing unit (GPU), a hardware processor core, or any combination thereof), a main memory 5004 and a static memory 5006, some or all of which may communicate with each other via an interlink (e.g., bus) 5008. Main memory 5004 comprises volatile memory, such as a Random Access Memory (RAM). Static memory 5006 comprises Read-Only-Memory (ROM), which may store firmware, a Basic Input Output System (BIOS), Unified Extensible Firmware Interface (UEFI). The computer system 5000 may further include a display unit 5010, an alphanumeric input device 5012 (e.g., a keyboard), and a user interface (UI) navigation device 5014 (e.g., a mouse). In an example, the display unit 5010, input device 5012 and UI navigation device 5014 may be a touch screen display. The computer system 5000 may additionally include a storage system such as memory system 5016 (which may be an example of memory system 1010) a signal generation device 5018 (e.g., a speaker), a network interface device 5020, and one or more sensors 5021, such as a global positioning system (GPS) sensor, compass, accelerometer, or other sensor. The computer system 5000 may include an output controller 5028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The memory system 5016 may include a machine readable medium 5022 on which is stored one or more sets of data structures or instructions 5024 (e.g., software) embodying or utilized by any one or more of the techniques or functions described herein. The instructions 5024 may also reside, completely or at least partially, within the main memory 5004, within static memory 5006, or within the hardware processor 5002 during execution thereof by the computer system 5000. In an example, one or any combination of the hardware processor 5002, the main memory 5004, the static memory 5006, or the memory system 5016 may constitute machine readable media.

While the machine readable medium 5022 is illustrated as a single medium, the term "machine readable medium" may include a single medium or multiple media (e.g., a centralized or distributed database, and/or associated caches and servers) configured to store the one or more instructions 5024.

The term "machine readable medium" includes any medium that is capable of storing, encoding, or carrying instructions for execution by the computer system 5000 and that cause the computer system 5000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media include: non-volatile memory, such as semiconductor memory systems (e.g., Electrically Programmable Read-Only Memory (EPROM), Electrically Erasable Programmable Read-Only Memory (EEPROM)) and flash memory systems; magnetic disks, such as internal hard disks and removable disks; magneto-optical disks; Random Access Memory (RAM); Solid State Drives (SSD); and CD-ROM and DVD-ROM disks. In some examples, machine readable media may be non-transitory machine readable media. In some examples, machine readable media may be machine readable media that is not a transitory propagating signal.

The instructions 5024 may further be transmitted or received over a communications network 5026 using a transmission medium via the network interface device 5020. The Computer system 5000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMaxe), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 5020 may include one or more physical jacks (e.g., Ethernet, coaxial, or phone jacks) or one or more antennas to connect to the communications network 5026. In an example, the network interface device 5020 may include a plurality of antennas to wirelessly communicate using at least one of single-input multiple-output (SIMO), multiple-input multiple-output (MIMO), or multiple-input single-output (MISO) techniques. In some examples, the network interface device 5020 may wirelessly communicate using Multiple User MIMO techniques.

Figure 6:
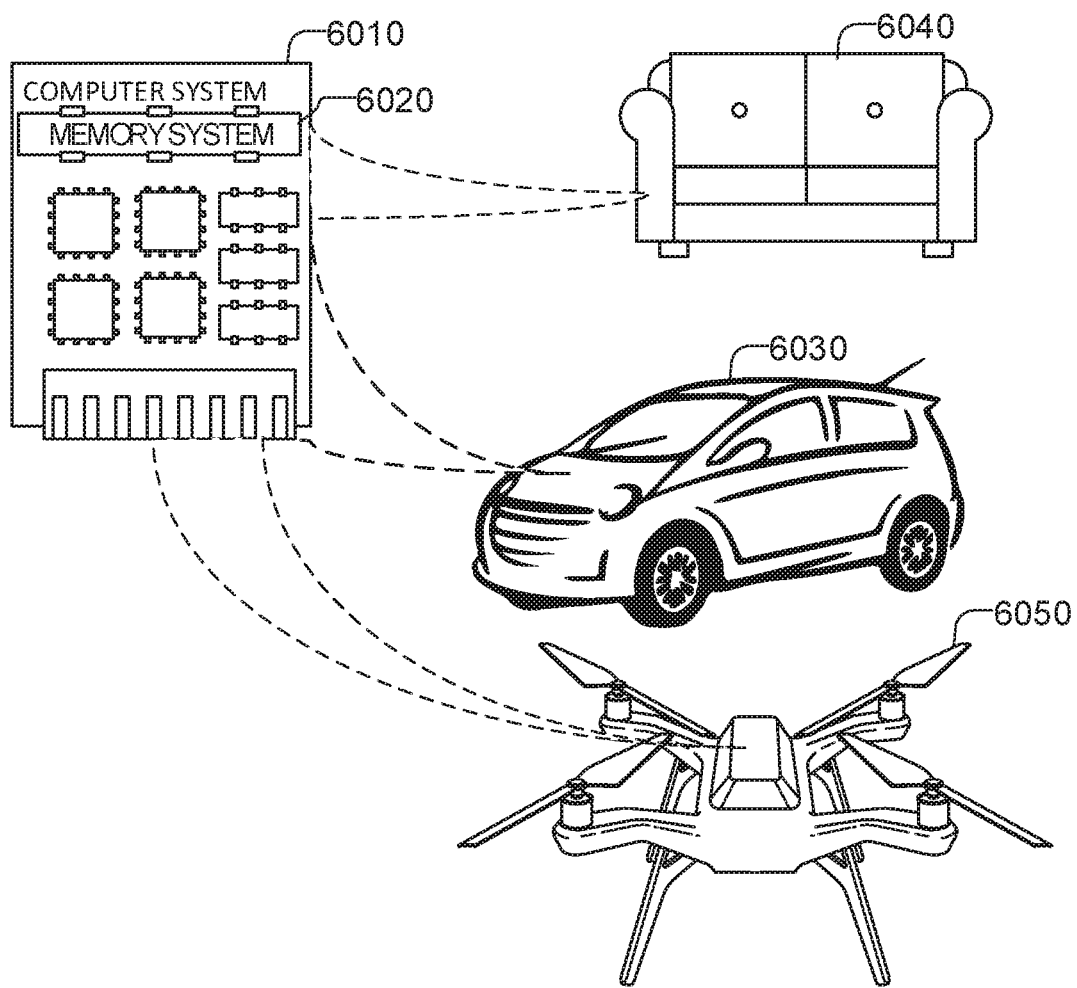
FIG. 6 shows an example computer system with a memory system as part of one or more apparatuses.

FIG. 6 shows an example computer system 6010 (e.g., computer system 5000) with a memory system 6020 (e.g., memory system 1010, 4010, 5016) as part of one or more apparatuses 6030-6050. Apparatuses include any device that may include a computer system, such as computer system 6010. As previously noted, the computer system 6010 (and computer system 5000) may be any device capable of executing instructions (sequential or otherwise). Example apparatuses include an automobile 6030 (e.g., as part of an infotainment system, a control system, or the like), a drone 6050 (e.g., as part of a control system), furniture or appliances 6040 (e.g., as part of a sensor system, an entertainment or infotainment system), or the like. In other examples, although not shown, apparatuses may include aeronautical, marine, Internet of Things (IOT), and other devices.

Other Notes and Examples

Example 1 is a memory system, comprising: a non-volatile memory array, the non-volatile memory array including multiple addressable memory storage locations and storing an access rule, the access rule specifying a control register, the control register modifiable from an initial value only by extending the value of the control register; a second memory array storing the control register; and a controller, the controller coupled to the non-volatile memory array and the second memory array; the controller to perform operations comprising: receive a request to access a particular one of the multiple addressable memory storage locations of the non-volatile memory array; determine, based upon the access rule, that the particular memory storage location is protected by the access rule; and in response to the determination that the particular memory storage location is protected by the access rule, determining that the particular memory storage location is accessible given a value of the control register; and responsive to determining that the particular memory storage location is accessible given the value of the control register, process the request to access the particular memory storage location.

In Example 2, the subject matter of Example 1 optionally includes wherein the controller is to perform further operations comprising: receive a command to extend the control register, the command including an extension value; extending the control register by applying an algorithm to the value of the control register and the extension value to create a new value; and setting the control register to the new value.

In Example 3, the subject matter of Example 2 optionally includes wherein the algorithm is a hash algorithm.

In Example 4, the subject matter of any one or more of Examples 2-3 optionally include wherein the controller is to perform further operations comprising: receive a second request to access the particular one of the multiple addressable memory storage locations of the non-volatile memory array; determine, based upon the access rule, that the particular memory storage location is protected by the access rule; and in response to the determination that the particular memory storage location is protected by the access rule, determining that the particular memory storage location is not accessible given the new value of the control register; and responsive to determining that the particular memory storage location is not accessible given the new value of the register, deny the request to access the particular memory storage location.

In Example 5, the subject matter of any one or more of Examples 1-4 optionally include wherein the controller is to perform further operations comprising: receive a second request to access another one of the multiple addressable memory storage locations of the non-volatile memory array; determine, based upon a second access rule, that the another addressable memory storage location is protected by the second access rule, the second access rule specifying a second control register, the second control register modifiable from an initial value only by extending the value of the second control register; and in response to the determination that the another memory storage location is protected by the second access rule, determining that the another memory storage location is not accessible given the value of the second register: and responsive to determining that the another memory storage location is not accessible given the value of the second register, deny the second request.

In Example 6, the subject matter of any one or more of Examples 1-5 optionally include wherein the controller is to determine that the particular memory storage location is accessible by evaluating the access rule using a value of the control register to produce a Boolean value indicating that the memory storage location is accessible.

In Example 7, the subject matter of Example 6 optionally includes wherein the controller is to determine that the particular memory storage location is accessible if the value of the control register equals the comparison value.

In Example 8, the subject matter of any one or more of Examples 1-7 optionally include wherein the controller is to perform further operations to: set the control register to the initial value upon system power up.

Example 9 is a memory access method comprising: receiving a request to access a particular addressable memory storage location of a non-volatile memory array, the non-volatile memory array storing an access rule, the access rule specifying a control register, the control register modifiable from an initial value only be extending the value of the control register, the control register in a second memory array; determining, based upon the access rule, that the particular memory storage location is protected by the access rule; and in response to the determination that the particular memory storage location is protected by the access rule, determining that the particular memory storage location is accessible given a value of the control register; and responsive to determining that the particular memory storage location is accessible given the value of the control register, processing the request to access the particular memory storage location.

In Example 10, the subject matter of Example 9 optionally includes receiving a command to extend the control register, the command including an extension value; extending the control register by applying an algorithm to the value of the control register and the extension value to create a new value; and setting the control register to the new value.

In Example 11, the subject matter of Example 10 optionally includes wherein the algorithm is a hash algorithm.

In Example 12, the subject matter of any one or more of Examples 10-11 optionally include receiving a second request to access the particular one of the multiple addressable memory storage locations of the non-volatile memory array; determining, based upon the access rule, that the particular memory storage location is protected by the access rule; and in response to determining that the particular memory storage location is protected by the access rule, determining that the particular memory storage location is not accessible given the new value of the control register; and responsive to determining that the particular memory storage location is not accessible given the new value of the register, denying the request to access the particular memory storage location.

In Example 13, the subject matter of any one or more of Examples 9-12 optionally include receiving a second request to access another one of the multiple addressable memory storage locations of the non-volatile memory array; determining, based upon a second access rule, that the another addressable memory storage location is protected by the second access rule, the second access rule specifying a second control register, the second control register modifiable from an initial value only by extending the value of the second control register; and in response to determining that the another memory storage location is protected by the second access rule, determining that the another memory storage location is not accessible given the value of the second register; and responsive to determining that the another memory storage location is not accessible given the value of the second register, denying the second request.

In Example 14, the subject matter of any one or more of Examples 9-13 optionally include wherein determining that the particular memory storage location is accessible comprises evaluating the access rule using a value of the control register to produce a Boolean value indicating that the memory storage location is accessible.

In Example 15, the subject matter of Example 14 optionally includes wherein determining that the particular memory storage location is accessible comprises evaluating if the value of the control register equals the comparison value.

In Example 16, the subject matter of any one or more of Examples 9-15 optionally include setting the control register to the initial value upon system power up.

Example 17 is a machine readable medium, comprising instructions, which when executed by a machine, cause the machine to perform operations comprising: receiving a request to access a particular addressable memory storage location of a non-volatile memory array, the non-volatile memory array storing an access rule, the access rule specifying a control register, the control register modifiable from an initial value only be extending the value of the control register, the control register in a second memory array; determining, based upon the access rule, that the particular memory storage location is protected by the access rule: and in response to the determination that the particular memory storage location is protected by the access rule, determining that the particular memory storage location is accessible given a value of the control register; and responsive to determining that the particular memory storage location is accessible given the value of the control register, processing the request to access the particular memory storage location.

In Example 18, the subject matter of Example 17 optionally includes wherein the operations comprise: receiving a command to extend the control register, the command including an extension value; extending the control register by applying an algorithm to the value of the control register and the extension value to create a new value; and setting the control register to the new value.

In Example 19, the subject matter of Example 18 optionally includes wherein the algorithm is a hash algorithm.

In Example 20, the subject matter of any one or more of Examples 18-19 optionally include wherein the operations comprise: receiving a second request to access the particular one of the multiple addressable memory storage locations of the non-volatile memory array; determining, based upon the access rule, that the particular memory storage location is protected by the access rule; and in response to determining that the particular memory storage location is protected by the access rule, determining that the particular memory storage location is not accessible given the new value of the control register; and responsive to determining that the particular memory storage location is not accessible given the new value of the register, denying the request to access the particular memory storage location.

In Example 21, the subject matter of any one or more of Examples 17-20 optionally include wherein the operations comprise: receiving a second request to access another one of the multiple addressable memory storage locations of the non-volatile memory array; determining, based upon a second access rule, that the another addressable memory storage location is protected by the second access rule, the second access rule specifying a second control register, the second control register modifiable from an initial value only by extending the value of the second control register; and in response to determining that the another memory storage location is protected by the second access rule, determining that the another memory storage location is not accessible given the value of the second register; and responsive to determining that the another memory storage location is not accessible given the value of the second register, denying the second request.

In Example 22, the subject matter of any one or more of Examples 17-21 optionally include wherein the operations of determining that the particular memory storage location is accessible comprises the operations of evaluating the access rule using a value of the control register to produce a Boolean value indicating that the memory storage location is accessible.

In Example 23, the subject matter of Example 22 optionally includes wherein the operations of determining that the particular memory storage location is accessible comprises the operations of evaluating if the value of the control register equals the comparison value.

In Example 24, the subject matter of any one or more of Examples 17-23 optionally include wherein the operations comprise setting the control register to the initial value upon system power up.

Example 25 is a memory controller, the memory controller comprising: a first memory location comprising a first value; and the memory controller configured to: receive, over a computer system bus, a request to extend the first value in the first memory location, the request including a computer system measurement value; set the first memory location to a new value that is calculated based upon a cryptographic hash of the first value and the new value.

In Example 26, the subject matter of Example 25 optionally includes wherein the cryptographic hash is a hash algorithm.

In Example 27, the subject matter of any one or more of Examples 25-26 optionally include wherein the controller is further configured to: set the value of the first memory location to an initial value upon power up of the memory controller.

In Example 28, the subject matter of any one or more of Examples 25-27 optionally include wherein the controller is further configured to: authenticate the request using a cryptographic key prior to setting the first memory location to the new value.

In Example 29, the subject matter of any one or more of Examples 25-28 optionally include wherein the controller is further configured to: receive, over the computer system bus, an access request from an application executing on a processor of the computer system for a second non-volatile memory location managed by the memory controller; and determine that for the second non-volatile memory location the value of a second memory location equals a second value to allow an access of the type requested by the application, and in response, process the request.

In Example 30, the subject matter of any one or more of Examples 25-29 optionally include wherein the first memory location is a platform configuration register.

Example 31 is a memory access control method comprising: receiving, over a computer system bus, a request to extend a first value in a first memory location, the request including a computer system measurement value; setting the first memory location to a new value that is calculated based upon a cryptographic hash of the first value and the new value.

In Example 32, the subject matter of Example 31 optionally includes wherein the cryptographic hash is a hash algorithm.

In Example 33, the subject matter of any one or more of Examples 31-32 optionally include setting the value of the first memory location to an initial value upon power up of the memory controller.

In Example 34, the subject matter of any one or more of Examples 31-33 optionally include authenticating the request using a cryptographic key prior to setting the first memory location to the new value.

In Example 35, the subject matter of any one or more of Examples 31-34 optionally include receiving, over the computer system bus, an access request from an application executing on a processor of the computer system for a second non-volatile memory location managed by the memory controller; and determining that for the second non-volatile memory location the value of a second memory location equals a second value to allow an access of the type requested by the application, and in response, process the request.

In Example 36, the subject matter of any one or more of Examples 31-35 optionally include wherein the first memory location is a platform configuration register.

Example 37 is a machine readable medium comprising instructions, which when executed by the machine, cause the machine to perform operations comprising: receiving, over a computer system bus, a request to extend a first value in a first memory location, the request including a computer system measurement value; setting the first memory location to a new value that is calculated based upon a cryptographic hash of the first value and the new value.

In Example 38, the subject matter of Example 37 optionally includes wherein the cryptographic hash is a hash algorithm.

In Example 39, the subject matter of any one or more of Examples 37-38 optionally include wherein the operations comprise: setting the value of the first memory location to an initial value upon power up of the memory controller.

In Example 40, the subject matter of any one or more of Examples 37-39 optionally include wherein the operations comprise: authenticating the request using a cryptographic key prior to setting the first memory location to the new value.

In Example 41, the subject matter of any one or more of Examples 37-40 optionally include wherein the operations comprise: receiving, over the computer system bus, an access request from an application executing on a processor of the computer system for a second non-volatile memory location managed by the memory controller; and determining that for the second non-volatile memory location the value of a second memory location equals a second value to allow an access of the type requested by the application, and in response, process the request.

In Example 42, the subject matter of any one or more of Examples 37-41 optionally include wherein the first memory location is a platform configuration register.

Example 43 is an Internet of Things (IoT) device, comprising: a processor; a memory system, comprising: a non-volatile memory array, the non-volatile memory array including multiple addressable memory storage locations and storing an access rule, the access rule specifying a control register, the control register modifiable from an initial value only by extending the value of the control register; a second memory array storing the control register; and a controller, the controller coupled to the non-volatile memory array and the second memory array; the controller to perform operations comprising: receive a request to access a particular one of the multiple addressable memory storage locations of the non-volatile memory array, the request from a computer program executing on the processor; determine, based upon the access rule, that the particular memory storage location is protected by the access rule: and in response to the determination that the particular memory storage location is protected by the access rule, determining that the particular memory storage location is accessible given a value of the control register: and responsive to determining that the particular memory storage location is accessible given the value of the control register, process the request to access the particular memory storage location.

In Example 44, the subject matter of Example 43 optionally includes wherein the controller is to perform further operations comprising: receive a command to extend the control register, the command including an extension value; extending the control register by applying an algorithm to the value of the control register and the extension value to create a new value; and setting the control register to the new value.

In Example 45, the subject matter of Example 44 optionally includes wherein the algorithm is a hash algorithm.

In Example 46, the subject matter of any one or more of Examples 44-45 optionally include wherein the controller is to perform further operations comprising: receive a second request to access the particular one of the multiple addressable memory storage locations of the non-volatile memory array; determine, based upon the access rule, that the particular memory storage location is protected by the access rule; and in response to the determination that the particular memory storage location is protected by the access rule, determining that the particular memory storage location is not accessible given the new value of the control register; and responsive to determining that the particular memory storage location is not accessible given the new value of the register, deny the request to access the particular memory storage location.

In Example 47, the subject matter of any one or more of Examples 43-46 optionally include wherein the controller is to perform further operations comprising: receive a second request to access another one of the multiple addressable memory storage locations of the non-volatile memory array; determine, based upon a second access rule, that the another addressable memory storage location is protected by the second access rule, the second access rule specifying a second control register, the second control register modifiable from an initial value only by extending the value of the second control register; and in response to the determination that the another memory storage location is protected by the second access rule, determining that the another memory storage location is not accessible given the value of the second register; and responsive to determining that the another memory storage location is not accessible given the value of the second register, deny the second request.

In Example 48, the subject matter of any one or more of Examples 43-47 optionally include wherein the controller is to determine that the particular memory storage location is accessible by evaluating the access rule using a value of the control register to produce a Boolean value indicating that the memory storage location is accessible.

In Example 49, the subject matter of Example 48 optionally includes wherein the controller is to determine that the particular memory storage location is accessible if the value of the control register equals the comparison value.

In Example 50, the subject matter of any one or more of Examples 43-49 optionally include wherein the controller is to perform further operations to: set the control register to the initial value upon system power up.

In Example 51, the subject matter of any one or more of the previous examples may optionally be implemented in an automotive device, such as an infotainment system.

In Example 52, the subject matter of any one or more of the previous examples may optionally be implemented in an appliance.

What is claimed is:

1. A memory system comprising:
    a non-volatile memory array, the non-volatile memory array including an addressable memory storage location and also storing an access rule, the access rule specifying a control register;
    a second memory array storing the control register; and
    a memory controller, the memory controller coupled to the non-volatile memory array and the second memory array, the memory controller configured to perform operations comprising:
    receiving a request to access the addressable memory storage location of the non-volatile memory array;
    determining that the addressable memory storage location is protected by the access rule; and
    in response to determining that the addressable memory storage location is protected by the access rule, determining that the addressable memory storage location is not accessible given a value of the control register and the access rule; and
    responsive to determining that the addressable memory storage location is not accessible given the value of the control register, denying the request to access the addressable memory storage location.

2. The memory system of claim 1, wherein the access rule is a conditional expression dependent upon the value of the control register.

3. The memory system of claim 1, wherein the operations of determining that the addressable memory storage location is not accessible given a value of the control register and the access rule comprises evaluating the access rule with the value of the control register by comparing the value of the control register to a specified value and determining that the value of the control register is not equal to the specified value.

4. The memory system of claim 1, wherein the value of the control register is dependent upon a state of a host system.

5. The memory system of claim 1, wherein the request is one of a read or write.

6. The memory system of claim 1, wherein the control register is a same length as a secure hash algorithm-1 SHA-1 or secure hash algorithm-2 (SHA-2) digest.

7. The memory system of claim 6, wherein the operations further comprise:
    prior to receiving the request,
    receiving a request to update the value of the control register, the request including a new value;
    determining an intermediate value created from an initial value of the control register and the new value; and
    updating the value of the control register by applying a hash function to the intermediate value.

8. The memory system of claim 7, wherein the new value is a measurement of a computing system state during a boot operation.

9. The memory system of claim 8, wherein the received request to update the value of the control register includes a cryptographic signature and wherein the operations further comprise:
    validating the cryptographic signature; and
    wherein the updating the value of the control register is performed responsive to validating the cryptographic signature.

10. The memory system of claim 1, wherein the value of the control register may be modified only by extending the value.

11. The memory system of claim 1, wherein the memory controller comprises one or more processors arranged to execute instructions stored in the memory device, wherein the instructions when executed by the one or more processors causes the one or more processors to perform the identified operations.

12. A method of managing a memory device, the method comprising:
    receiving a request to access an addressable memory storage location of a non-volatile memory array;
    determining that the addressable memory storage location is protected by an access rule;
    in response to determining that the addressable memory storage location is protected by the access rule, determining that the addressable memory storage location is not accessible given a value of a control register and the access rule; and
    responsive to determining that the addressable memory storage location is not accessible given the value of the control register, denying the request to access the addressable memory storage location.

13. The method of claim 12, wherein the access rule is a conditional expression dependent upon the value of the control register.

14. The method of claim 12, wherein determining that the addressable memory storage location is not accessible given a value of the control register and the access rule comprises evaluating the access rule with the value of the control register by comparing the value of the control register to a specified value and determining that the value of the control register is not equal to the specified value.

15. The method of claim 12, wherein the value of the control register is dependent upon a state of a host system.

16. The method of claim 12, Wherein the request is one of a read or write.

17. The method of claim 12, wherein the control register is a same length as a secure hash algorithm-1 SHA-1 or secure hash algorithm-2 (SHA-2) digest.

18. The method of claim 17, wherein the method further comprises:
   prior to receiving the request,
   receiving a request to update the value of the control register, the request including a new value;
   determining an intermediate value created from an initial value of the control register and the new value; and
   updating the value of the control register by applying a hash function to the intermediate value.

19. The method of claim 18, wherein the new value is a measurement of a computing system state during a boot operation.

20. The method of claim 12, wherein the value of the control register may be modified only by extending the value.

* * * * *